(12) United States Patent
Bajic et al.

(10) Patent No.: US 7,425,034 B2
(45) Date of Patent: Sep. 16, 2008

(54) AUTOMOTIVE VEHICLE SEAT HAVING A COMFORT SYSTEM

(75) Inventors: Goran Bajic, Belle River (CA); Lindy Brennan, Kingsville (CA); Scott Truant, Windsor (CA); Madalina Onica, Windsor (CA)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

(21) Appl. No.: 10/966,652

(22) Filed: Oct. 15, 2004

(65) Prior Publication Data

US 2005/0093347 A1 May 5, 2005

Related U.S. Application Data

(60) Provisional application No. 60/512,237, filed on Oct. 17, 2003.

(51) Int. Cl.
*A47C 7/72* (2006.01)
*A47C 7/02* (2006.01)

(52) U.S. Cl. .......................... 297/180.14; 297/180.12; 297/452.46; 297/452.47

(58) Field of Classification Search .......... 297/180.14, 297/180.13, 180.12, 180.1, 452.42, 452.46, 297/452.47, 284.4
See application file for complete search history.

(56) References Cited

U.S. PATENT DOCUMENTS

| | | | |
|---|---|---|---|
| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |

(Continued)

FOREIGN PATENT DOCUMENTS

CA 1266925 7/1960

(Continued)

OTHER PUBLICATIONS

Seat Heating Systems, Kongsberg Automotive.

(Continued)

*Primary Examiner*—Milton Nelson, Jr.
(74) *Attorney, Agent, or Firm*—Dobrusin & Thennisch PC

(57) ABSTRACT

There is disclosed a comfort system suitable for use in a seat of an automotive vehicle. The system preferably includes an air mover in fluid communication with an open space below a trim layer of the seat for providing ventilation, heating and/or cooling to the seat occupant.

27 Claims, 7 Drawing Sheets

U.S. PATENT DOCUMENTS

| | | |
|---|---|---|
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,628,829 A | 12/1971 | Hellig |
| 3,653,589 A | 4/1972 | McGrath |
| 3,653,590 A | 4/1972 | Elsea |
| 3,681,797 A | 8/1972 | Messner |
| 3,684,170 A | 8/1972 | Roof |
| 3,732,944 A | 5/1973 | Kendall |
| 3,736,022 A | 5/1973 | Radke |
| 3,738,702 A | 6/1973 | Jacobs |
| 3,757,366 A | 9/1973 | Sacher |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,175,297 A | 11/1979 | Robbins et al. |
| 4,259,896 A | 4/1981 | Hayashi et al. |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,102,189 A | 4/1992 | Saito et al. |
| 5,106,161 A | 4/1992 | Meiller |
| 5,117,638 A | 6/1992 | Feher |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,645,314 A | 7/1997 | Liou |
| 5,692,952 A | 12/1997 | Chih-Hung |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,902,014 A | 5/1999 | Dinkel et al. |
| 5,918,930 A | 7/1999 | Kawai et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A * | 12/1999 | Larsson ................. 297/452.42 |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,064,037 A | 5/2000 | Weiss et al. |
| 6,068,332 A | 5/2000 | Faust et al. |
| 6,079,485 A | 6/2000 | Esaki et al. |
| 6,105,667 A | 8/2000 | Yoshinori et al. |
| 6,119,463 A | 9/2000 | Bell |
| 6,124,577 A | 9/2000 | Fristedt |
| 6,147,332 A | 11/2000 | Holmberg et al. |
| 6,164,719 A | 12/2000 | Rauh |
| 6,179,706 B1 * | 1/2001 | Yoshinori et al. ........... 454/120 |
| 6,186,592 B1 | 2/2001 | Orizaris et al. |
| 6,189,966 B1 | 2/2001 | Faust et al. |
| 6,223,539 B1 | 5/2001 | Bell |
| 6,278,090 B1 | 8/2001 | Fristedt et al. |
| 6,291,803 B1 | 9/2001 | Fourrey |
| 6,300,150 B1 | 10/2001 | Venkatasubramanian |
| 6,425,637 B1 | 7/2002 | Gardner et al. |
| 6,434,328 B2 | 8/2002 | Rutherford |
| 6,478,369 B1 | 11/2002 | Aoki et al. |
| 6,481,801 B1 | 11/2002 | Schmale |
| 6,483,087 B2 | 11/2002 | Gardner et al. |
| 6,491,578 B2 | 12/2002 | Yoshinori et al. |
| 6,497,275 B1 | 12/2002 | Elliot |
| 6,501,055 B2 | 12/2002 | Rock et al. |
| 6,505,886 B2 | 1/2003 | Gielda et al. |
| 6,511,125 B1 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson et al. |
| 6,592,181 B2 | 7/2003 | Stiller et al. |
| 6,598,405 B2 | 7/2003 | Bell |

| Patent/Pub. No. | Date | Name |
|---|---|---|
| 6,604,785 B2 | 8/2003 | Bargheer et al. |
| 6,606,866 B2 | 8/2003 | Bell |
| 6,619,736 B2 | 9/2003 | Stowe et al. |
| 6,625,990 B2 | 9/2003 | Bell |
| 6,626,455 B2 | 9/2003 | Webber et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,682,140 B2 | 1/2004 | Minuth et al. |
| 6,685,553 B2 | 2/2004 | Aoki |
| 6,687,937 B2 | 2/2004 | Harker |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |
| 6,826,792 B2 | 12/2004 | Lin |
| 6,828,528 B2 | 12/2004 | Stowe et al. |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,893,086 B2 | 5/2005 | Bajic et al. |
| 6,929,322 B2 | 8/2005 | Aoki et al. |
| 6,957,545 B2 | 10/2005 | Aoki |
| 6,976,734 B2 | 12/2005 | Stoewe |
| 7,040,710 B2 | 5/2006 | White et al. |
| 7,052,091 B2 | 5/2006 | Bajic et al. |
| 7,083,227 B2 | 8/2006 | Brennan et al. |
| 7,131,689 B2 | 11/2006 | Brennan et al. |
| 2001/0035669 A1 | 11/2001 | Andersson et al. |
| 2002/0003363 A1 | 1/2002 | Buss et al. |
| 2002/0017102 A1 | 2/2002 | Bell |
| 2002/0092308 A1 | 7/2002 | Bell |
| 2002/0096915 A1 | 7/2002 | Haupt et al. |
| 2002/0096931 A1 | 7/2002 | White et al. |
| 2002/0105213 A1 | 8/2002 | Rauh et al. |
| 2002/0108381 A1 | 8/2002 | Bell |
| 2002/0139123 A1 | 10/2002 | Bell |
| 2002/0140258 A1 | 10/2002 | Ekern et al. |
| 2002/0148234 A1 | 10/2002 | Bell |
| 2002/0148235 A1 | 10/2002 | Bell |
| 2002/0148236 A1 | 10/2002 | Bell |
| 2002/0148345 A1 | 10/2002 | Hagiwari |
| 2002/0150478 A1 | 10/2002 | Aoki |
| 2003/0005706 A1 | 1/2003 | Bell |
| 2003/0024924 A1 | 2/2003 | Fristedt |
| 2003/0029173 A1 | 2/2003 | Bell et al. |
| 2003/0079770 A1 | 5/2003 | Bell |
| 2003/0084935 A1 | 5/2003 | Bell |
| 2003/0102699 A1 | 6/2003 | Aoki et al. |
| 2003/0150229 A1 | 8/2003 | Aoki et al. |
| 2002/0067058 A1 | 9/2003 | Pfahler |
| 2004/0036326 A1* | 2/2004 | Bajic et al. ............. 297/180.14 |
| 2004/0100131 A1 | 5/2004 | Howick et al. |
| 2004/0104607 A1 | 6/2004 | Takesahi et al. |
| 2004/0118555 A1 | 6/2004 | Fristedt |
| 2004/0139758 A1 | 7/2004 | Toshifumi et al. |
| 2004/0189061 A1 | 9/2004 | Hartwick et al. |
| 2004/0195870 A1 | 10/2004 | Bohlender et al. |
| 2004/0245811 A1 | 12/2004 | Bevan et al. |
| 2005/0066505 A1 | 3/2005 | Iqbal et al. |
| 2005/0067862 A1 | 3/2005 | Iqbal et al. |
| 2005/0072165 A1 | 4/2005 | Bell |
| 2005/0093347 A1 | 5/2005 | Bajic et al. |
| 2005/0140189 A1 | 6/2005 | Bajic et al. |
| 2005/0173950 A1 | 8/2005 | Bajic et al. |
| 2005/0200179 A1 | 9/2005 | Bevan et al. |
| 2005/0257541 A1 | 11/2005 | Kadle et al. |
| 2005/0264086 A1 | 12/2005 | Lofy et al. |
| 2006/0048518 A1 | 3/2006 | Bell |
| 2006/0103183 A1 | 5/2006 | White et al. |
| 2006/0130490 A1 | 6/2006 | Petrovski |
| 2006/0152044 A1 | 7/2006 | Bajic et al. |
| 2006/0158011 A1 | 7/2006 | Marlovits et al. |
| 2006/0197363 A1 | 9/2006 | Lofy et al. |
| 2006/0208540 A1 | 9/2006 | Lofy et al. |
| 2006/0214480 A1 | 9/2006 | Terech |
| 2007/0001507 A1 | 1/2007 | Brennan et al. |

FOREIGN PATENT DOCUMENTS

| | | |
|---|---|---|
| DE | 3705756 | 2/1987 |
| DE | 4112631 | 4/1992 |
| DE | 19503291 | 8/1996 |
| DE | 19654370 | 3/1998 |
| DE | 197 36 951 A1 | 3/1999 |
| DE | 19737636 | 3/1999 |
| DE | 19805174 | 6/1999 |
| DE | 19810936 | 9/1999 |
| DE | 19920451 | 12/1999 |
| DE | 19954978 | 1/2001 |
| DE | 10001314 | 7/2001 |
| DE | 100 24 880 | 9/2001 |
| DE | 10013492 | 9/2001 |
| DE | 10030708 | 1/2002 |
| DE | 10144839 | 3/2003 |
| DE | 10241571 | 3/2004 |
| DE | 10261902 | 8/2004 |
| DE | 10316732 | 10/2004 |
| DE | 10338525 | 3/2005 |
| DE | 10346064 | 4/2005 |
| EP | 0128534 | 12/1981 |
| EP | 0280213 | 8/1988 |
| EP | 0517615 | 12/1992 |
| EP | 411375 | 5/1994 |
| EP | 0730720 B1 | 11/1994 |
| EP | 0809576 | 12/1997 |
| EP | 0936105 | 8/1999 |
| EP | 1075984 | 7/2000 |
| EP | 1050429 | 11/2000 |
| EP | 1123834 | 12/2000 |
| EP | 1075984 | 2/2001 |
| EP | 1088696 | 4/2001 |
| EP | 1266794 | 12/2002 |
| EP | 1323573 | 7/2003 |
| EP | 1349746 | 8/2003 |
| FR | 2599683 | 6/1986 |
| FR | 2630056 | 4/1988 |
| FR | 2694527 | 2/1994 |
| FR | 2845318 | 4/2004 |
| JP | 1171509 | 7/1989 |
| JP | 5277020 | 10/1993 |
| JP | 8285423 | 1/1996 |
| JP | 10044756 | 2/1998 |
| JP | 2000125990 | 2/2000 |
| JP | 2001071800 | 3/2001 |
| JP | 2002125801 | 5/2002 |
| JP | 200225539 | 8/2002 |
| JP | 2002234332 | 8/2002 |
| JP | 2003042594 | 2/2003 |
| JP | 2004224108 | 8/2004 |
| JP | 2004283403 | 10/2004 |
| SE | 0102983 | 3/2003 |
| WO | WO 91/12150 | 8/1991 |
| WO | WO 94/09684 | 5/1994 |
| WO | WO96/05475 | 10/1995 |
| WO | WO 97/09908 | 3/1997 |
| WO | WO9900268 | 1/1999 |

| | | |
|---|---|---|
| WO | WO 01/43507 | 6/2001 |
| WO | WO 02/05341 A1 | 1/2002 |
| WO | WO 02/006914 A1 | 1/2002 |
| WO | WO 03/015583 A2 | 2/2003 |
| WO | WO 03/051666 | 6/2003 |
| WO | WO 03/077710 | 9/2003 |
| WO | WO 03/101777 | 12/2003 |
| WO | WO 03/106215 | 12/2003 |
| WO | WO 2004/082989 | 3/2004 |
| WO | WO 04/028857 | 4/2004 |
| WO | WO 04/078517 | 9/2004 |
| WO | WO 04/09166 | 10/2004 |
| WO | WO 04/091966 | 10/2004 |
| WO | WO 04/091967 | 10/2004 |
| WO | WO 04/096601 | 11/2004 |
| WO | WO 04/096602 | 11/2004 |
| WO | WO 04/114513 | 12/2004 |
| WO | WO 05/021320 | 3/2005 |
| WO | WO 05/035305 | 4/2005 |
| WO | WO 05/042299 | 5/2005 |
| WO | WO 05/042301 | 5/2005 |
| WO | WO 05/047056 | 5/2005 |
| WO | WO 05/068253 | 7/2005 |
| WO | WO 05/110806 | 11/2005 |

OTHER PUBLICATIONS

Automotive Seat Heating Systems, Bauerhin International.
Specializing in Seat Ventilation and Heating Systems, Seat Comfort Systems, http://www.seatcomfort.com/semashow1.htm, Jun. 10, 2003.
About I-Car, Current Events/News:enewsletters: Advantage Online: Aug. 27, 2001.
Seat Comfort systems, Specializing in Seat Ventilation and Heating Systems, http://www.seatcomfort.com/ventilation.com, Jun. 10, 2003.
Komfortabel bei jeder Temperatur, Klimasitze.
Co-pending U.S. Appl. No. 09/619,171, filed Jul. 19, 2000, Ventilated Seat Having a Pad Assembly and a Distribution Device.
Co-pending U.S. Appl. No.60/474,835, filed on May 30, 2003; Heater for an Automotive Vehicle and Method of Forming Same. (1139-005P2).
Co-pending U.S. Appl. No. 60/428,002, filed Nov. 21, 2002; Heater for an Automotive Vehicle and Method of Forming Same.
Co-pending U.S. Appl. No. 60/505,806, filed Sep. 25, 2003; Improved Energy Efficient Personal Comfort System and Methods. (1139-018P1).
Co-pending U.S. Appl. No. 10/715,160, filed Nov. 17, 2003; Heater for an Automotive Vehicle and Method of Forming Same. (1139-005).
Co-pending U.S. Appl. No. 10/434,890, filed May 9, 2003; Automotive Vehicle Seat Insert. (1139-001).
GMT 830 Heating and Ventilation System, IGB Automotive Ltd. Feb. 13, 2003.
Automotive Heated Seats—Heated Steering Wheels, IGB Automotive Ltd.
International Search Report for Application No. PCT/US03/19929 dated Oct. 10, 2003.
International Search Report dated Sep. 28, 2005; PCT/IB2004/003931.
Copending U.S. Appl. No. 11/623,833.

* cited by examiner

US 7,425,034 B2

AUTOMOTIVE VEHICLE SEAT HAVING A COMFORT SYSTEM

CLAIM OF PRIORITY

This application claims the benefit of U.S. provisional application No. 60/512,237, filed on Oct. 17, 2003, which is hereby incorporated by reference.

FIELD OF THE INVENTION

The present invention relates generally to an automotive vehicle seat, and more particularly to an automotive vehicle seat having a comfort system configured for providing heating, cooling, ventilation, a combination thereof or the like to a passenger of the vehicle seat.

BACKGROUND OF THE INVENTION

For many years the transportation industry has been concerned with designing seats for automotive vehicles that provide added comfort to occupants in the seats. Various innovations in providing seating comfort are discussed in U.S. Pat. Nos. 6,064,037; 5,921,314; 5,403,065; 6,048,024 and 6,003,950, all of which are expressly incorporated herein by reference for all purposes. In addition, other innovations in providing seating comfort are discussed in U.S. patent application Ser. No. 09/619,171, filed Jul. 19, 2000, titled "Ventilated Seat Having a Pad Assembly and a Distribution Device"; U.S. patent application Ser. No. 09/755,505, filed Jan. 5, 2001, titled "Ventilated Seat"; and U.S. patent application Ser. No. 09/755,506, filed Jan. 5, 2001, titled "Portable Ventilated Seat", each of which are expressly incorporated herein by reference for all purposes. In the interest of continuing such innovation, the present invention provides an improved comfort system, which is preferably suitable for employment within or as part of an automotive vehicle seat and which assists in providing comfort control to an occupant in the seat.

SUMMARY OF THE INVENTION

According to the present invention, there is disclosed an automotive vehicle seat. The seat typically provides an open space beneath an air-permeable trim surface of the seat. Preferably, the open space is located between the trim surface and a cushion of the seat. An air mover is typically in fluid communication with the open space for moving air through the open space, the air permeable trim surface or both.

In one embodiment, the air mover is conveniently mounted upon or fastened to one or more components of the seat such as a lumbar adjustment assembly (e.g., lumbar wires or other guide members) of the seat or a frame of the seat. Advantageously, such components of the seat may be a standard part of a particular seat or may be easily adaptable for supporting the air mover such that minimal costs are added to the seat.

In alternative or additional embodiments, a tubular structure may assist in providing fluid communication between the air mover and the open space. Advantageously, such a tubular structure can assist in allowing the air mover to be more conveniently located relative to various seating components.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing an automotive vehicle seat configured for providing heating, cooling, ventilation or a combination thereof to an occupant in the seat. The seat typically includes an open space beneath an air-permeable trim surface of the seat. Preferably, the open space is located between the trim surface and a cushion of the seat. An air mover is typically in fluid communication with the open space for moving air through the open space, the air permeable trim surface or both. In one embodiment, the air or other fluid mover is conveniently mounted upon or fastened to one or more components of the seat such as a lumbar adjustment assembly (e.g., lumbar rods or wires) of the seat or a frame of the seat. Advantageously, such components of the seat may be a standard part of a particular seat or may be easily adaptable for supporting the air mover such that minimal costs are added to the seat. In alternative or additional embodiments, a tubular structure may assist in providing fluid communication between the air mover and the open space. Advantageously, such a tubular structure can assist in allowing the air mover to be more conveniently located relative to various seating components. In other additional or alternative embodiments, the seat may include a barrier layer disposed between the trim layer of the seat and the open space.

Figure 1:
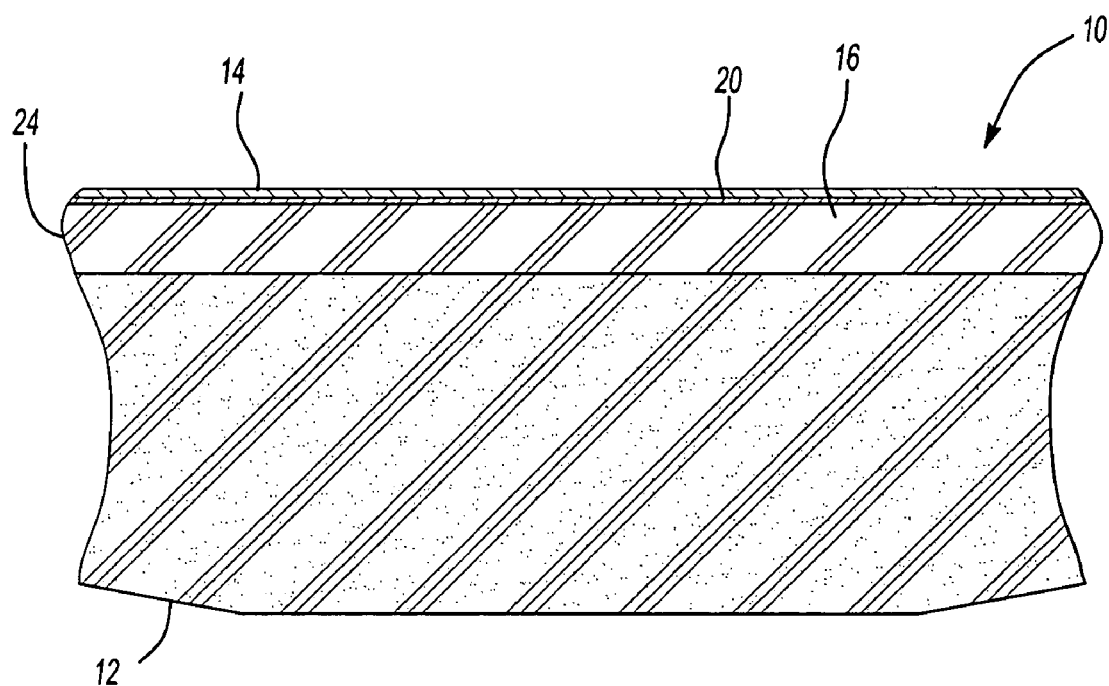
FIG. 1 is a side sectional view of a portion of an exemplary seat according to the present invention.
Figure 1A:
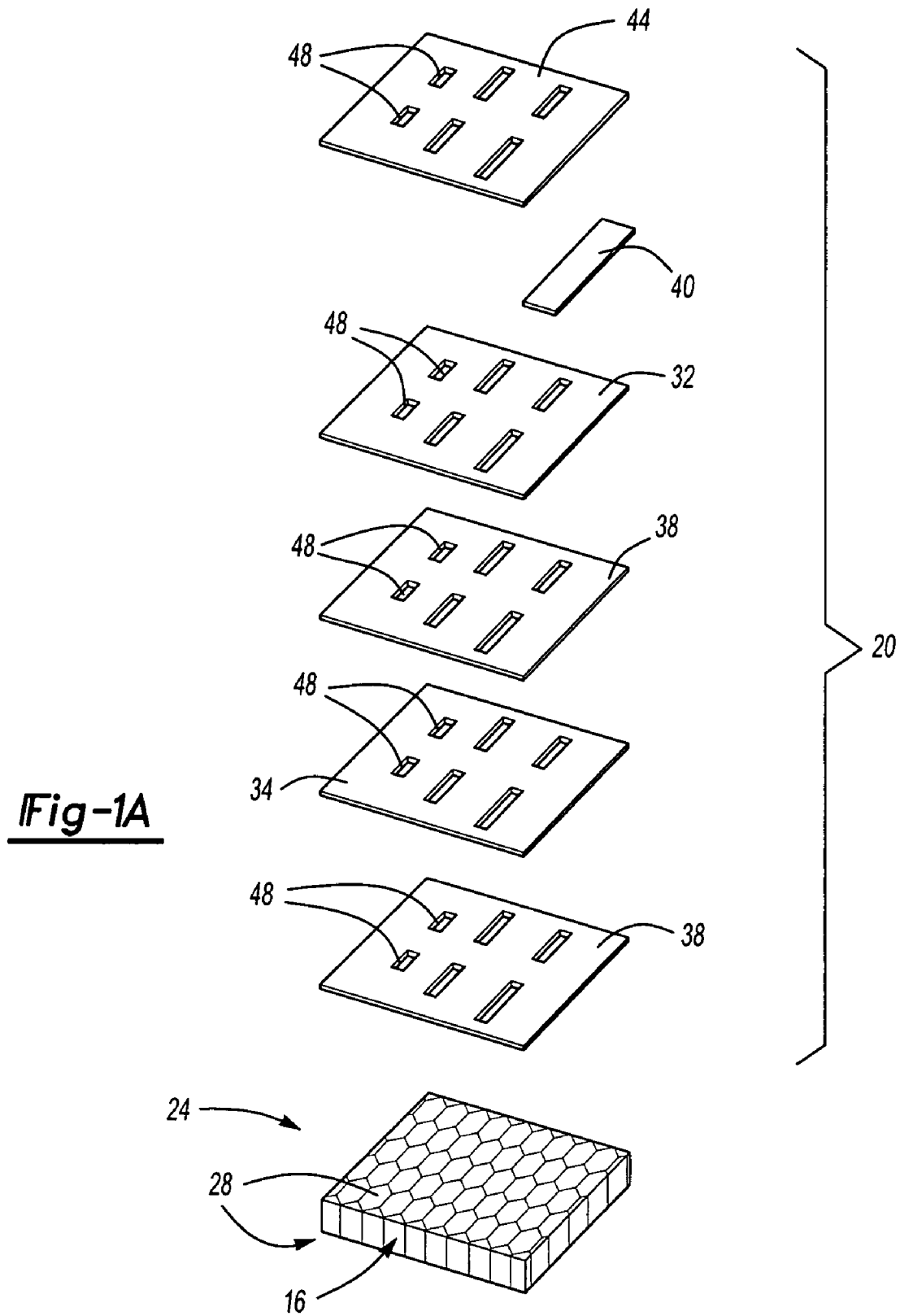
FIG. 1A is an exploded perspective view of various layers and sub-layers of an exemplary comfort system according to an aspect of the present invention.

Referring to FIGS. 1 and 1A, there are illustrated portions of a seat component 10, which could be a backrest cushion component or a seat cushion component according to the present invention. The seat component 10 typically includes a seat cushion 12, a trim layer 14 and an open space 16 therebetween. In the embodiment depicted, the seat component 10 also advantageously includes a forward layer 20, which may include a barrier sub-layer, a heater sub-layer or both. In another embodiment, the layer 20 may be located between open space 16 and the seat cushion 12. As used herein, seat cushion is used to refer to both the cushion upon which the occupant sits and to the cushion against the occupant may lean, i.e. the backrest cushion.

The trim layer 14 may be formed of any materials suitable for automotive vehicle seats such as cloth, perforated and non-perforated leather, combinations thereof or other like materials. In a preferred embodiment, the trim layer 14 is formed of a perforated leather having openings (e.g., through-holes) suitable for having fluid (e.g., ambient air, heated air, cooled air or a combination thereof) flow therethrough. In one embodiment, the leather is tanned or otherwise treated in a manner to maintain a relatively high moisture content, reduce its thermal insulation value effectively allowing it to alter its intrinsic specific heat so that the leather maintains less thermal energy. Also, such leather may permit the number of openings in the perforated leather may be reduced or eliminated.

The cushion 12 may also be formed of any material suitable for automotive vehicle seats. Exemplary materials includes foams (e.g., polymer/isocyanate foams) or other cushion materials. The cushion or cushion material include an air-impermeable barrier between the cushion and the open space. The air-impermeable barrier typically covers at least the portion of the cushion that is used by an occupant, although the barrier may be located on other portions of the cushion including on any through passages or sub-passages in the cushion. The barrier may additionally or alternatively include a coating material applied to the material of the cushion, a separate lining material that may be attached to the cushion or a space layer a chemically treated a surface of the cushion (e.g. a skin), or any combination thereof.

The open space 16 may be provided in a variety of ways, but is typically provided by positioning a spacer layer 24 between the seat cushion 12 and the trim layer 14. The spacer layer 24 is typically formed of a spacer material and the spacer material may be selected from a variety of different materials. The spacer material may be provided as a variety of synthetic materials such as plastic or polymeric materials, padding and stuffing materials, lining and carrier materials, combinations thereof or the like. Preferably, the spacer material is at least partially pliable or flexible. As examples, the spacer layer may be provided as a plurality of rubber, foam, plastic or other members or fibers. The members or fibers are preferably spaced apart from each other to define the open space 16 therebetween while still being close enough together to provide cushion and support. As another example the spacer layer may be formed of a 3-dimensional spacer fabric structure or material.

The particular spacer layer 24 shown is formed of polymeric (e.g., polyester) strand material that is interwoven to provide opposing honeycomb structures 28 (e.g., fabric panels), which are interconnected by several additional polymeric strand materials to provide the open space 16 between the structures 28 while still providing cushion and support. As an example, one preferred material is sold under the tradename 3MESH® and is commercially available from Müller Textil GmbH, Germany or Müller Textiles, Inc., Rhode Island, USA.

As discussed, the forward layer 20, when included, can have a barrier sub-layer, a heater or heater sub-layer or both. In the embodiment depicted, the forward layer 20 includes a heater sub-layer 32, which is preferably laminated to a gas barrier sub-layer 34 (e.g., a film, a textile or otherwise) although neither are necessarily required. Various different types of heaters are suitable for incorporation into a car seat and it is contemplated that any of such heaters may be incorporated into the seat of the present invention. Such heaters typically incorporate flexible electrical heating elements that are preferably thin, flat, non-obtrusive or a combination thereof. As examples, a lay-wire heater, a carbon fiber heater, a positive thermal coefficient (PTC) heater, a thermoelectric heater or the like, which are typically supported with a backing (e.g., a cloth or fabric type backing) may be used. In a preferred embodiment, the heater sub-layer is a carbon fiber type heater with a backing (e.g., a nonwoven layer). One exemplary preferred heater is sold under the tradename CARBOTEX® and commercially available from W.E.T Automotive Systems, Inc. in Germany and/or FTG Fraser-Technik GmbH, Schleizer Strasse 56–58, D-95028 Hot/Saale, Germany. An example of such a heater is disclosed in U.S. Pat. No. 6,064,037, issued May 16, 2000, herein expressly incorporated by reference for all purposes.

When included, the barrier sub-layer 34 is typically formed of a plastic or polymeric material that softens or melts upon exposure to heat to assist the sub-layer 34 in adhering to one or more other layers or sub-layers. Alternatively, the barrier sub-layer 34 may be formed of fabrics, woven materials (e.g, goretex or microfibers), nylon, foam, including closed pore foam or other materials. Preferably, the barrier sub-layer 34 is substantially impermeable to fluids and particularly air such that the sub-layer 34 can assist in forming an air barrier as will be described further herein. Dimensionally, for a film barrier sub-layer, it is preferable for the film thickness to be about 0.1 mm to about 2.0 mm thick and more preferably about 0.7 mm to about 1.0 mm thick. Of course, it is contemplated that a film sub-layer may have a variable thickness and may be outside of the aforementioned ranges.

As mentioned above, gas barrier sub-layer 34 also may be located between the open space and the cushion. In this aspect, the barrier sub-layer preferably provides a barrier adapted to prevent fluid flow through or into the cushion. In another embodiment, multiple similar or different sub-layers are utilized.

The forward layer 20 can also include one or more buffer sub-layers, one or more adhesives or adhesive sub-layers, one or more tape sub-layers, one or more porous foam layers or a combination thereof. Adhesive may be supplied in layers, drops or in a variety of other configurations. Preferably, the buffer layer is at least partially formed of an insulating material.

In the preferred embodiment depicted, the forward layer includes two adhesive sub-layers 38, one strip of tape 40 and one buffer sub-layer 44. The adhesive sub-layers 38 are preferably formed of a hot melt adhesive although not necessarily required. The adhesive may be provided as a web or otherwise and may be continuous or non continuous (e.g., may be applied in drops, dabs or the like). The adhesive sub-layers may include polyamides, polyesters, elastomers, urethanes, olefin polymers or a combination thereof. Moreover, the adhesives may be formulated as desired for particular processing parameters or conditions. Preferably, the adhesive sub-layers are substantially free of anti-blocking solutions, blowing additives, process contaminants or the like which might interfere with adhesive performance. As an example, one suitable hot melt adhesive is commercially available as a non-woven web under the tradename SPUNFAB® from Spunfab, Ltd. 175 Muffin Lane, Cuyahoga Falls, Ohio 44223.

The buffer sub-layer 44 in the embodiment depicted is a layer of gauze which is capable of protecting the heater sub-layer 32 although various alternative protective materials may be used such as cloth, fleece or the like. Optionally the buffer sub-layer 44 may include adhesive material for laminating it to other sub-layers. The tape 40, when used, is preferably tacky on two sides.

It is also contemplated that the seat component 10 may include a second open space (not shown) provided between the barrier sub-layer 34 and the trim layer 14, although not required. Thus, it is contemplated that the forward layer 20 may also include a spacer layer (not shown), which may be located between the buffer sub-layer 44 and an occupant of the seat. The air-permeable layer, which may be any one of a variety of air-permeable materials (such as reticulated foam, for example) may be able to help distribute air under the occupant. It is also contemplated that such a spacer layer may be formed of any of the other materials described in relation to the other spacer layer 24. In such an embodiment, the heater sub-layer 32, when provided, may be above or below the second open space.

Generally, it is contemplated that the various layers and sub-layers described above may be combined in a variety of sequences and according to a variety of protocols and technique. Thus, the order in which the various layers and sub-layers are combined and the techniques of combining should not in any way limit the present invention unless such order or techniques is specifically claimed. It is also contemplated that there may be greater or fewer layers and that each layer may include greater or fewer sub-layers. Moreover, it is contemplated that the layers may be secured between the cushion and trim layer using a variety of techniques.

Figure 3:
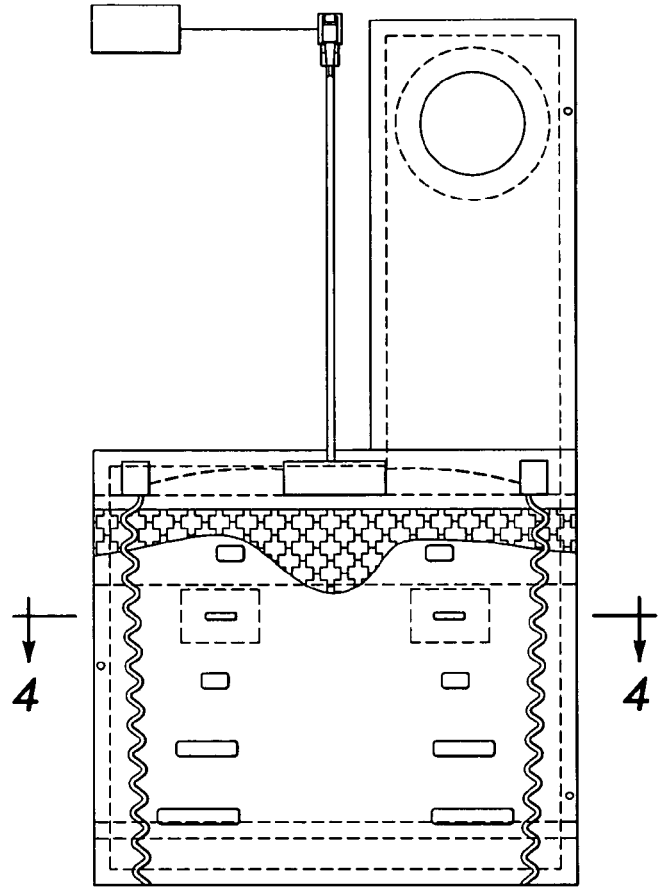
FIG. 3 is a perspective partially cut-away view of an exemplary insert, which may be used according to the present invention.
Figure 4:
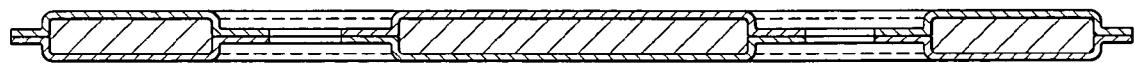
FIG. 4 is a sectional view of the insert of FIG. 3 taken along line 4—4.

The layers and sub-layers discussed, may be provided by a bag-type or a peripheral edge sealed insert such as that shown in FIGS. 3 and 4. An example of such an insert is described in U.S. patent application Ser. No. 10/434,890, filed May 9, 2003 and expressly incorporated herein by reference. Alternatively, however, the layers may be provided in a non-sealed condition or as an open edge insert as depicted in FIGS. 1 and 1A such that there is no added peripheral seal about the spacer layer 24.

According to a preferred method, the sub-layers of the forward layer are each laminated to each other followed by laminating the forward layer to the spacer layer. Of course, the forward layer and the spacer layer could be laminated together at the same time that the sub-layers of the forward layer are laminated together. Referring to FIGS. 1 and 1A, the forward layer is formed according to a preferred method by feeding the various sub-layers 32, 34, 38, 44 to a laminator (e.g., a belt and roller laminator).

The sub-layers 32, 34, 38, 44 are preferably fed to the laminator from rolls or otherwise and are cut to shape to form the forward layer after lamination. The forward layer 20 may be cut to nearly any desired shape or configuration. In the illustrated embodiment, the forward layer 20 is cut to be generally rectangular and to include a plurality of through-holes 48. The through-holes 48 may be arranged in a generally rectangular configuration or any other configuration and may each be substantially the same size or differently sized. In FIGS. 1A and 3, however, the through-holes 48 are shown in a preferred configuration as progressively becoming larger from one side of the forward layer to another. The through-holes 48 are optional especially for layers and sub-layers that are not located between the spacer layer and the occupant. Indeed, in some embodiments, the sub-layer, e.g. barrier sub-layer, does not have through-holes.

Once the spacer layer 24 has been appropriately cut or otherwise shaped to the proper configuration, which preferably corresponds to the forward layer 20, the forward layer is laminated to the spacer layer 24. Of course, it is contemplated that the forward layer 20 and the spacer layer 24 may be laminated to each other prior to cutting the layers.

In the preferred embodiment, the layers 20, 24 are laminated in a stationary lamination device at elevated temperatures such that the adhesive sub-layer 38 of the forward layer 20 adheres and attaches the forward layer 20 to the spacer layer 24 (e.g., the honeycomb structure). As such, laminating of the layers and cutting of the layers may be integrated into a single processing step. For example, it is contemplated that supplies (e.g., rolls) of each of the layers 20, 24 may be provided to a machine that laminates the layers 20, 24 together and cuts the layers 20, 24, to the desired configuration. Alternatively, such cutting may be performed by another cutting machine or device. In such an embodiment, it is contemplated that the through-holes in the forward layer 20 may be formed prior to, during or after lamination.

It is also contemplated that additional cutting or laminating steps may also be employed. For example, it is contemplated that the layers, the sub-layers or both may be partially cut or shaped prior to stationary or other lamination and further cut or shaped after such lamination.

During final assembly, for embodiments including the heater sub-layer 32, a wire harness or other electrical connection is preferably inserted within a pocket formed by the tape or otherwise attached to the forward layer 20. For assembly of the layers to a vehicle seat, the laminated layers are preferably connected (e.g., sewn, adhered or otherwise attached) to a portion of the seat such as the cover (e.g., a perforated leather cover) or to the cushion (e.g., foam) of the seat. In one preferred embodiment, a seat cover may be configured to include a pocket for receiving the layers. Alternatively, it is contemplated that hook and loop fasteners may be utilized to attach the layers to portions (e.g., the cover or foam cushion) of the seat. For example, a strip of hook and loop fastener may be attached (e.g., adhered) to the spacer layer and another strip of hook and loop fastener may be attached (e.g., adhered) to the foam cushion within a trench. Thus, the strips can be fastened to each other thereby attaching the layers 20, 24 to the cushion 12. The forward layer 20 is preferably closer to the outer seat cover relative to the spacer layer 24 although not necessarily required.

Generally, the present invention provides for fluid communication between an air mover and the open space 16. In one embodiment, the air mover may be in direct fluid communication with the open space. In other embodiments, however, a tubular structure is provided for facilitating fluid communication between the air mover and the open space 16.

It is contemplated that a variety of air movers may be employed according to the present invention. Exemplary air movers include, without limitation, blowers, fans, pumps combinations thereof or the like. Air movers of the present invention may be configured for moving heated air, cooled air, ambient air or a combination thereof. As an example, an ambient air mover might be a fan or blower that pushes or pulls air from inside the vehicle cabin through the open space of the comfort system. A heated or cooled air mover might be, for example, a blower or fan coupled with a heating and/or cooling unit (e.g., a thermoelectric heater, cooler or both) wherein the unit heats or cools air from the cabin of the vehicle prior to pushing the air through the open space of the system to the trim surface of the seat. In one embodiment, the air mover may be coupled with a heating and/or cooling unit in a single integrated component. For example a thermoelectric element may comprise on or more parts of a blower or fan, (e.g. as part of the blades). For example, as seen in U.S. Pat. Nos. 6,119,463; 6,223,539; and 6,606,866, all of which are incorporated by reference.

The air mover may be positioned in a variety of locations relative to the components of the seat for allowing it to move air through the open space of the system and/or for allowing it to move air through the trim layer of the seat. The air mover may be directly adjacent the open space provided by the spacer material. In such an embodiment, the air mover may be located in a recess of the occupant side of the seat cushion and may provide direct fluid communication between the open space of the system and an opening (e.g., a through-hole) in the seat cushion. Alternatively, the air mover may be located at least partially between the seat cushion component and the backrest component for providing fluid communication between the open space and the air mover, the interior of the vehicle cabin or both. In addition, the air mover may be located within the seat cushion remote from the occupant side i.e. enclosed within at least a minimal amount of seat cushion material, on the underside of the seat cushion or remote from the backrest e.g. near the front of the seat cushion.

One or more structures may facilitate fluid communication between an air mover and the open space. For example, one or more passages or sub-passages may be formed within, through or on the seat cushion for forming a tubular structure that provides fluid communication between the open space and the air or other fluid mover through the opening. As discussed above, the passages may be coated or lined to improve their air-impermeability. Such passages and sub-passages may also include structures or features that reduce the collapse of the passages and sub-passages under the weight of the occupant. Typically, the passage will be centrally located, e.g. along either the front-to-back or side-to-side centerline of the cushion, so as efficiently distribute air from the air mover; however, this is not necessarily the case. This passage may be located anywhere on the seat (e.g. proximate or within a thigh bolster) such as along the front or back edges of the seat or along either side edge. The passage may also be located in any quadrant of the cushion.

Alternatively, additional components may be employed to provide fluid communication between the air mover and the open space. Examples of such additional components include, without limitation, tubes or tubular structures formed of materials such as polymers, foams, fabrics, adhesives, metals, fibrous materials, combinations thereof or the like.

For embodiments including a tubular structure, the tubular structure may extend behind the seat cushion, to the underside of the cushion, to a location within the cushion or elsewhere. When extending to the air or other fluid mover, the tubular structure may extend around the seat cushion, extend between two or more seat cushions or portions of seat cushions, extend through a portion or the entirety of the seat cushion (e.g. a through-hole), a combination thereof or the like. Also, more than one tubular structure may be utilized. When multiple tubular structure are utilized, one or more air or other fluid movers may be utilized and the tubular structures may be the same or different in the manner in which they extend to the air or other fluid mover. Moreover, it is contemplated that the tubular structure may be shaped as desired to assist it in extending to a desired location behind the seat cushion. For example, the extension may be arced, angled, contoured, straight or otherwise configured as it extends away from the rest of the insert.

Figure 5:
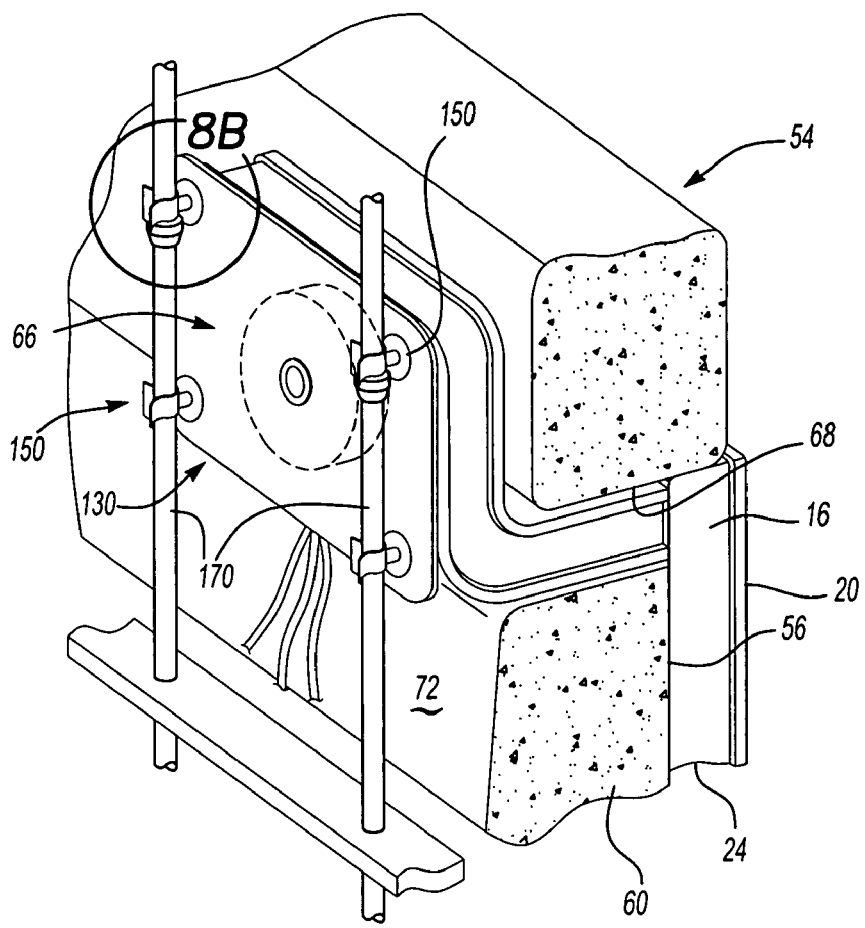
FIG. 5 is a rear cut away perspective view of an exemplary backrest component with an air mover assembly and an exemplary tubular structure assembled thereto.

Referring to FIG. 5, there is illustrated a seat backrest component 54 having a system in accordance with the present invention. Like in FIG. 1, the system of FIG. 5 includes the spacer layer 24 for forming the open space 16 and, optionally, includes the forward layer 20. In the embodiment depicted, the spacer layer 24 overlays a forward surface 56 of a backrest cushion 60 of the backrest component 54. Of course, the layer 20, 24 may be attached to the cushion 60 or a cover or trim layer using any of the attachments disclosed herein. The system also includes a tubular structure 62 for providing fluid communication between the open space 16 and an air mover 66.

As shown, the backrest cushion 60 has an opening 68 (e.g., a slot or through-hole) extending generally through the cushion 60 of the backrest component 54. In particular, the opening 68 extends through the forward surface 56 and a rearward surface 72 of the cushion 60 at a central area of the cushion 60. In the embodiment shown, the opening 68 is sized to receive the tubular structure 62 and the tubular structure 62 extends at least partially or fully into and through the opening 68 and the cushion 60 preferably substantially seals (e.g., interferingly seals, adhesively seals or otherwise seals) about an outer surface of the tubular structure 62. Alternatively, however, it is contemplated that the tubular structure 62 may not extend into the opening 68 and that the structure 62 is otherwise situated (e.g., abuttingly adhered) to form substantially fluid tight communication between the tubular structure 62 and the opening 68. The tubular structure 62 also extends behind the cushion 60 to oppose at least a portion of the rearward surface 72 of the cushion 60. In the embodiment shown, the tubular structure 62 extends to the air mover 66 (e.g., a blower or blower assembly), which is also located behind the cushion 60. As can be seen, the tubular structure 62 is generally flexible thereby allow the structure 62 to be contoured (e.g., curved or angled) to extend to and/or through the opening 68.

Figure 7:
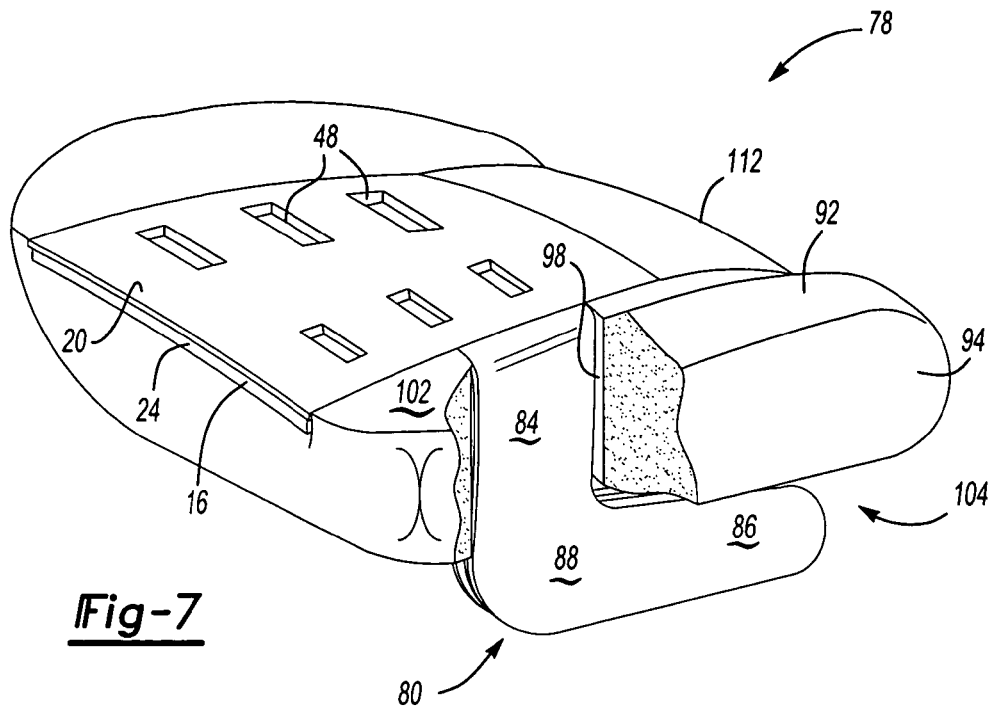
FIG. 7 is a top perspective view of another exemplary tubular structure being assembled to an exemplary partially cut away seat component of a vehicle seat.
Figure 8:
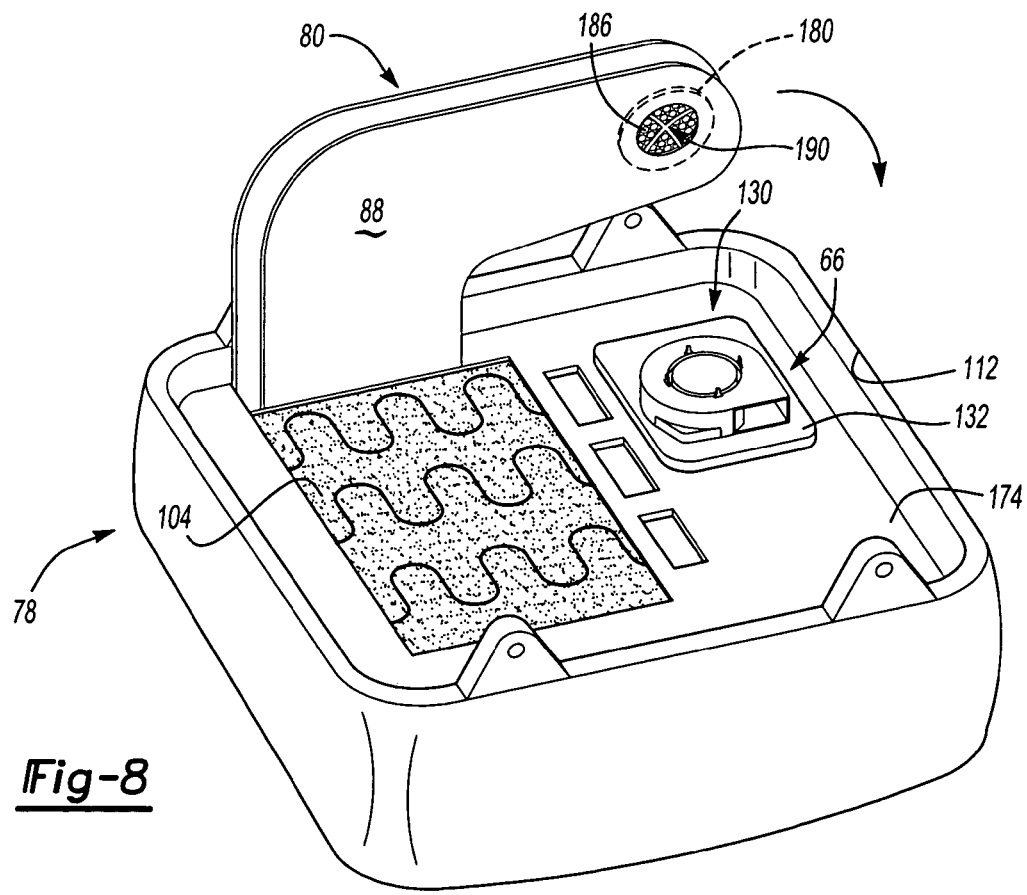
FIG. 8 is a bottom perspective view of the exemplary seat component of FIG. 7 during assembly.
Figure 9:
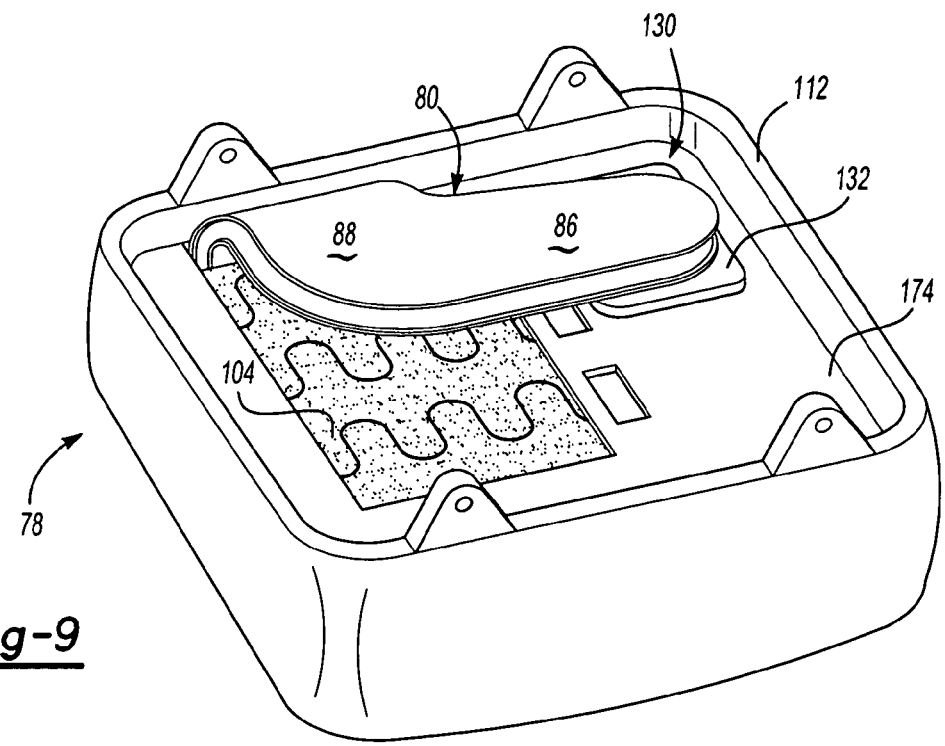
FIG. 9 is another bottom perspective view of the exemplary seat component of FIG. 7 after assembly.

Referring to FIGS. 7–9, there is illustrated an alternative system with a seat cushion component 78 having the spacer layer 24 for forming the open space 16 and, optionally, includes the forward layer 20 an alternative tubular structure 80 according to the present invention. As with previous systems, the tubular structure 80 can be configured in a manner similar to any of the tubular structures described herein, however, the tubular structure 80 is additionally contoured (e.g., arced or angle) or non-linear. In particular, the tubular structure 80 extends from a first end portion 84 to a second end portion 86 with a contoured (e.g., arced, angled or non-linear) portion 88 therebetween. Preferably, the contoured portion 88 arcs to allow at least the second end portion 86 to be of the tubular structure 80 to substantially coextend or become substantially parallel with a side edge 42 of a cushion 94. It should be recognized that the tubular structure 80 is naturally contoured (e.g., arced, angled or non-linear), which as used herein means that the contoured portion is contoured without external forces required to create the contoured portion.

As shown in cut-away, the seat cushion 94 has an opening 98 (e.g., a slotted through-hole) extending generally through the cushion 94 of the seat cushion component 78. In particular, the opening 98 extends through a forward surface 102 and a rearward surface 104 of the cushion 94 at a side area of the cushion 94. In the embodiment shown, the opening 98 is sized to receive the tubular structure 80 and the tubular structure 80 extends at least partially or fully into and through the opening 98 and the cushion 94 preferably substantially seals (e.g., interferingly seals, adhesively seals or otherwise seals) about an outer surface of the tubular structure 80. Alternatively, however, it is contemplated that the tubular structure 80 may not extend into the opening 98 and that the structure 80 is otherwise situated (e.g., abuttingly adhered) to form substantially fluid tight communication between the tubular structure 80 and the opening 98. The tubular structure 80 also extends behind the cushion 94 to oppose at least a portion of the rearward surface 104 of the cushion 94.

In the embodiment shown, the tubular structure 80 extends to an air mover 66 (e.g., a blower assembly or blower), which is also located behind the cushion 94. As an added advantage, the contoured portion 88 allows the tubular structure 80 to easily extend toward a forward edge 112 of the seat cushion 94 and/or seat cushion component 78. It should be understood, however, that such a contoured portion 88 may be configured to allow the tubular structure 80 to extend toward any desired location.

It should be understood that in any of the embodiments disclosed herein, steps used to assemble the system to a seat may be carried out in any desired order. For example, the spacer material may be attached to the cushion followed by extending the tubular structure through the cushion opening. Alternatively, the tubular structure may be extended through the cushion first.

Generally, the air mover (e.g., the blower or blower assembly) may be attached as needed or desired to various different components of the vehicle seat or to other portions of the vehicle depending upon the seat configuration, the vehicle configuration or both. For example, the air mover may be attached to a cushion of the seat (e.g., a seat or backrest cushion), a frame of the seat, one or more rod supports of the seat, one or more location adjustment components of the seat, one or more frame supports for the seat, combinations thereof or the like. It is also contemplated that the blower may not be attached to any components other than the tubular structure.

Preferably, the air mover is attached to a component that maintains a substantially identical location with respect to a seat or backrest cushion particularly during adjustment of the cushion position or seat. Of course, it is contemplated that the location of the air mover may change relative to the seat or backrest cushion as well.

It is also contemplated that the air mover may be attached to components of the seat or other portions of the vehicle with a variety of fastening mechanisms. For example, the air mover may be attached to the various components with one or more mechanical fasteners such as clips, rivets, screws, bolts, interference fit fasteners, snap fit fasteners, integral fasteners, non-integral fasteners, combinations thereof or the like. Other fasteners which may be employed include adhesives, tapes, magnets, combinations thereof or the like.

Depending on the desired configuration, the one or more fasteners may be integrally formed with the air mover (e.g., the housing or other components of a blower) or the one or more fasteners may be separately formed from the air mover and attached thereto. Alternatively, a mounting structure may be attached to the air mover and the one or more fasteners may be integrally formed with the mounting structure or the one or more fasteners may be separately formed from the mounting structure and attached thereto. When used, the mounting structure may be attached to the air mover using any of the fasteners or fastening methods disclosed herein with respect to the air mover and the seat. It is also contemplated that the mounting structure may be integrally formed with one or more of the seat components discussed herein.

Figure 10:
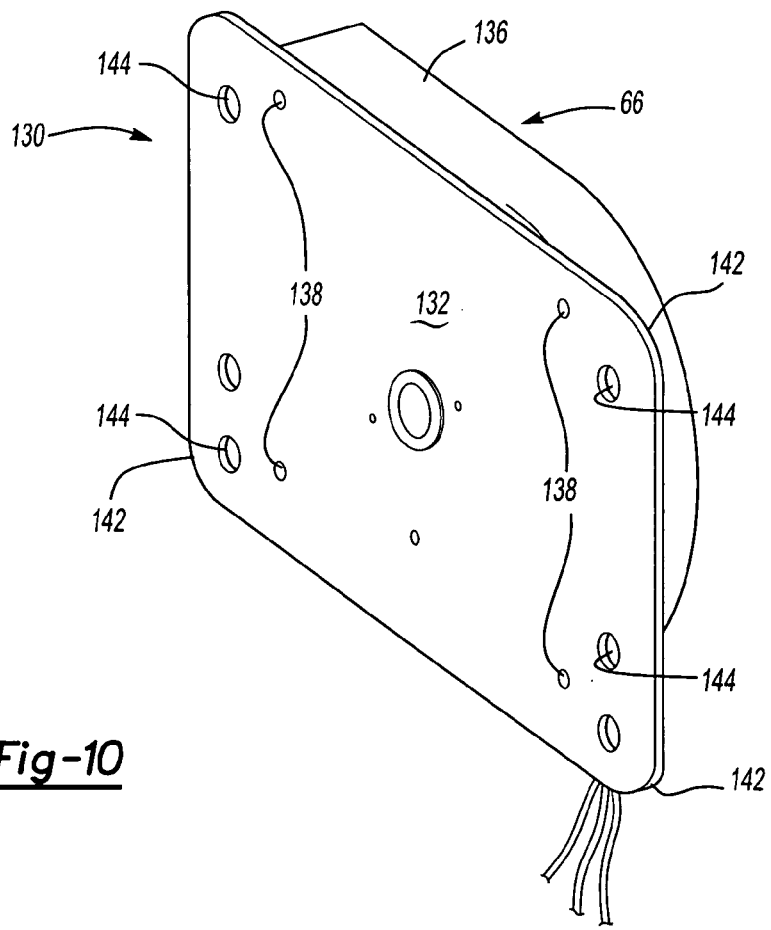
FIG. 10 is a rear perspective view of an exemplary blower assembly according to the present invention.
Figure 11:
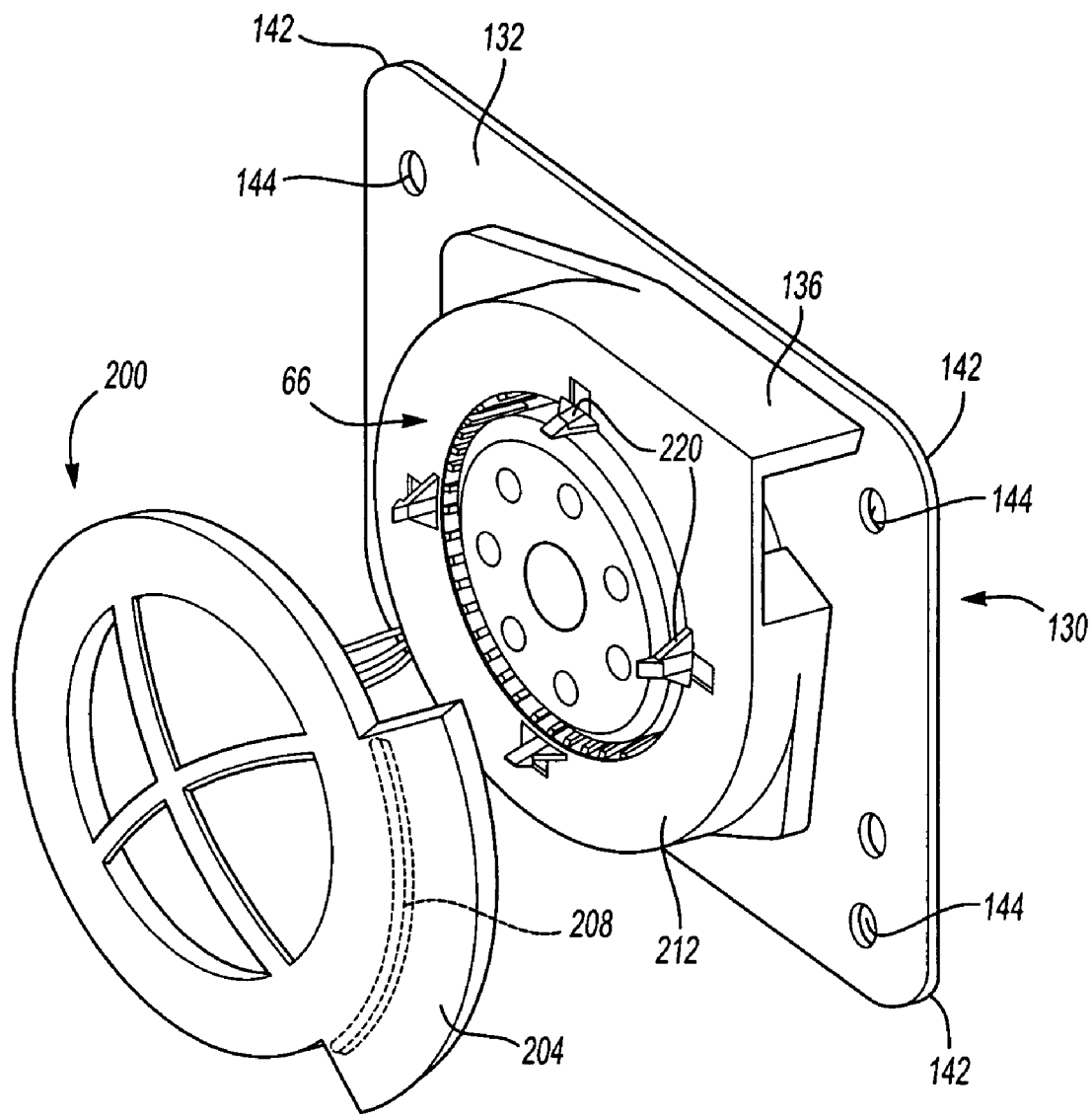
FIG. 11 is a front perspective view of the exemplary blower assembly of FIG. 10.

Referring to FIGS. 10 and 11, there is illustrated one exemplary air mover or blower assembly 130 according to the present invention. The assembly 130 includes the blower 66 attached to a mounting structure 132. Of course, the blower 66 may be configured for moving heated air, cooled air, ambient air or a combination thereof.

In the particular embodiment shown, the blower 66 includes a housing 136 (e.g., a plastic housing) that is attached to the mounting structure 132 with a plurality of fasteners 138 (e.g., screws). The mounting structure 132 is shown as a substantially rectangular metal plate with rounded off corners 142 and a plurality of openings 144 (e.g., through-holes) extending through the plate, one opening 144, adjacent each corner 142. Of course, it is contemplated that a variety of structures other than plates may be employed as the mounting structure and a variety of materials (e.g., plastics, fabrics or the like) may be employed for forming the structure in a variety of alternative configurations.

Figure 6:
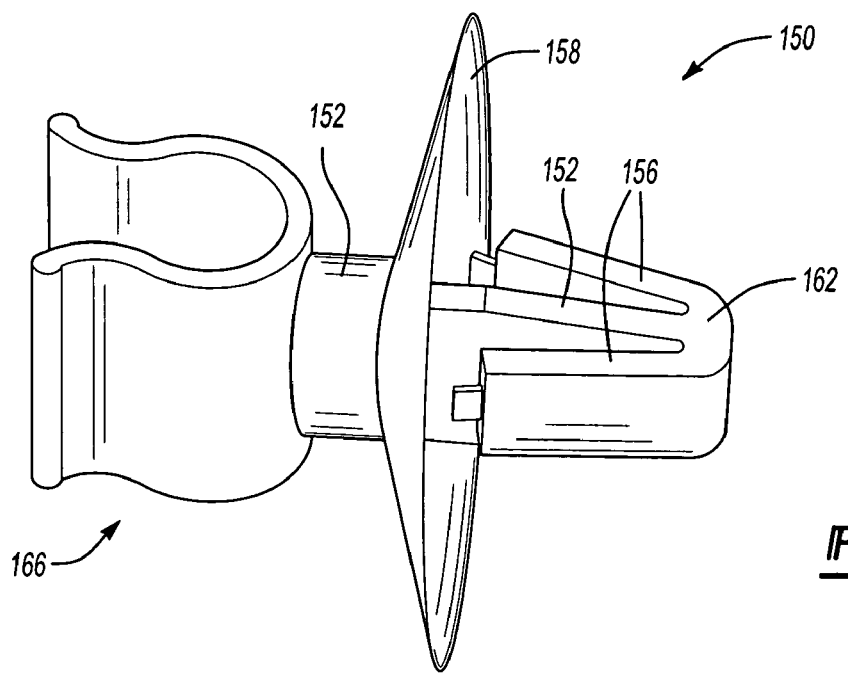
FIG. 6 is a perspective view of an exemplary fastener, which is employed for attaching the air mover assembly to a seat.

The assembly 130, as shown in FIG. 5 also includes one or more (e.g., four) fasteners 150 attached thereto. As shown in FIG. 6, each fastener 150 includes a body portion 152 with projections 156,158 extending therefrom for interference fitting the fastener 150 to the mounting structure 132. In the embodiment shown, each fastener 150 includes a pair of projections 156 extending from an end 162 of the fastener 156 and a conical projection 158. Preferably the pair of projections 156 and the conical projection 158 extend at least partially toward each other, although not required.

Each fastener 150 also includes a fastening mechanism 166 for attaching the fastener 150, the blower assembly 130 or both to one or more components of the seat or other portions of the automotive vehicle. Preferably, the fastening mechanism 166 can be attached by interference fit, adhesion, magnetism or otherwise. In the particular embodiment depicted, the fastening mechanism 166 is a C-shaped clip configured for forming an interference fit. It is generally contemplated that the fastening mechanism may be fitted with a locking mechanism (not shown) to enhance the ability of the fastening mechanism 166 in attaching to members.

In FIG. 5, the air mover assembly 130 is attached to a pair of members 170 that extend substantially parallel to the back surface 72 of the backrest cushion 60 or backrest cushion component 54. As shown, the members 170 extend substantially vertically when the backrest component 54 is in the upright position, although they may extend in a variety of directions depending upon the members 170 employed and the seat configuration. In the particular embodiment illustrated, the members 170 are cylindrical metal rods that form a portion of a lumbar or back support adjustment assembly. Preferably, the members 170 are substantially stationary relative to the backrest component 54, although this is not required.

In addition to the above, it is contemplated that the air mover 66 or air mover assembly 130 might be attached to various different components of a lumbar support adjustment assembly. For example, the air mover 66 or air mover assembly 130 may be attached to plates, flexible members, fasteners, motors or other components of such an assembly.

For attaching the air mover assembly 130 to the members 170, the end 162 and projections 156 of the fasteners 150 are extended through the openings 144 of the mounting structure 132 until the mounting structure 132 is interference fit between the pair of projections 156 and the conical projection 158. Also, the fastening mechanisms 166 of each of fasteners 150 are interference fit (e.g., at least partially clipped about) the members 170.

As shown, the mounting structure 132 is between the members 170 and the cushion 60. In an alternative embodiment, however, the mounting structure 132 may be located on a side of the members 170 away from the cushion 60. In such an embodiment, the fasteners 150 would have to be reversed such that the fastening mechanisms 166 extend toward the cushion 60 and the air mover 66 would be located at least partially between the members 170. Advantageously, such an embodiment can provide for greater space between the air mover 66 and the cushion 60 for allowing air to flow to or from the air mover 66 more easily.

Referring to FIGS. 10 and 11, the air mover assembly 130 is attached to a support frame 174 for the cushion 94. As depicted, the mounting structure 132 is attached to the support frame 174. It is contemplated, however, that the air mover 66 may be directly attached to the support frame 174 and the mounting structure 132 may be removed. Moreover, the support frame 174, particularly when molded of plastic, can be molded to specifically receive the air mover 66 and assist in its attachment thereto.

Any one of the tubular structures of the present invention may be placed in fluid communication with the air movers of the present invention using a variety of different techniques, fastening mechanisms or the like. As an example, a tubular structure may be fastened (e.g., adhered, mechanically fastened, magnetized, combinations thereof or the like) to an air mover or another component to provide fluid communication. Preferably, although not required, fluid communication is established by positioning the tubular structure relative to the air mover such that the air movers can pull air from or push air into an opening (e.g., a tunnel or passage) defined by the tubular structure.

According to one embodiment, the air mover 66 (e.g., the blower assembly) of FIGS. 5 and 8, is preferably attached to an attachment component 180 (e.g., a ring) of the respective tubular structures 62, 80 for placing the air mover in fluid communication with the tubular structures. Additionally, the tubular structures 62, 80 include an opening 186 (e.g., a through-hole) extending in fluid communication with an internal opening 190 (e.g., a tunnel) of the tubular structures 62, 80. At least partially surrounding the openings 62, 80 are attachment components 180, which are attached (e.g., adhered) to the tubular structures 62, 80.

Figure 2:
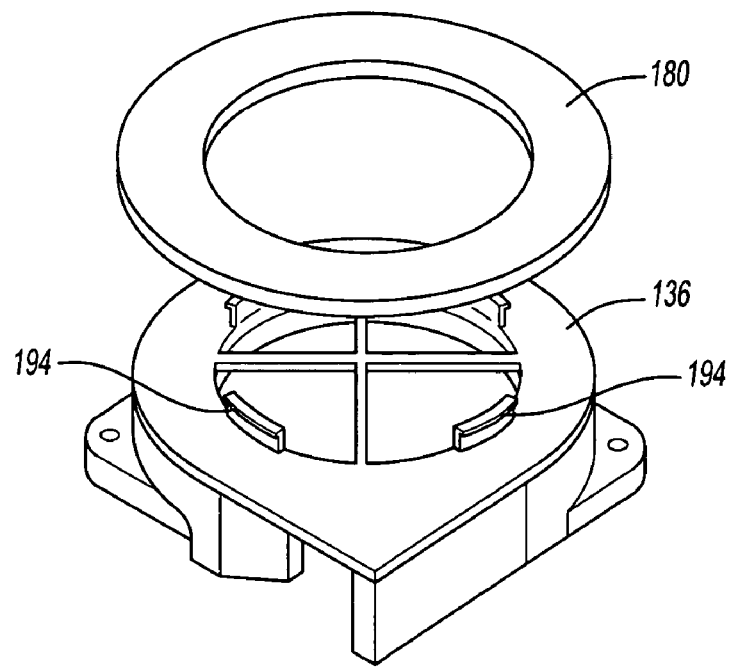
FIG. 2 is a perspective view of a portion of an exemplary air mover according to an aspect of the present invention.

In the embodiment shown, and with additional reference to FIG. 2, the housing 130 includes flanges 194 suitable for snap-fitting the housing 136 to the attachment component 180. In this manner, the air mover 66 can be attached to and placed in fluid communication with the tubular structures 62, 80 and can, in turn, be placed in fluid communication with the through-holes 48 of the forward layer 20, the open space 16 of the spacer layer 24.

Advantageously, the attachment component 180 and flanges 194 can provide a unique and efficient method of attaching the air mover to the tubular structure. It is contemplated however, that various other methods of attachment (e.g., fasteners, sewing, mating threaded attachments, quick connects or the like) may be used to attach the air mover to the tubular structures. It is also contemplated that the attachment component 180 and the housing 136 and flanges 194 of the air mover may be varied within the scope of the present invention.

While is contemplated that any of the tubular structures may be attached to the air mover using the attachment component 180 of FIG. 2, it is also possible to design a ring, which aids in the assembly of the tubular structure to the blower. As an example, there is an attachment component 200 (e.g., a ring) illustrated in FIG. 11 having an extension 204 (e.g., a semi-circular extension) extending from the component 200 and a lip 208 located adjacent an interface of the component 200 and the extension 204. As shown, the extension 204 extends away from the ring component 200 in the same plane as the component 200 and the lip 208 extends from the extension 204 at least partially perpendicular to the plane of the attachment component 200 and the extension 204. Thus, the lip 208 is configured for extending outwardly away from any tubular structure into which the component 200 is installed.

To assemble the component 200, and the tubular structure when attached to the component 200, to the air mover 130, the lip 208 can be abuttingly engaged with the housing 136 of the blower 66 adjacent an edge 212 of the housing 136. In turn, the component 200 is aligned with fasteners 220 of the air mover 66 such that the component 200 may be snap-fit to the fasteners 220 as described previously with regard to the component 180 of FIG. 2.

It should be recognized that various alternative attachments other than the rings described may be employed to attach the air movers to the tubular structures. For example, attachments such as twist locks, spring locks, tabs on a ring, tabs on the air mover housing, combinations thereof or the like may be employed. It should be further recognized that the air mover, the snap ring or both can include protective equipment such as fingerguards (e.g., cross-bars) or the like.

Operation

In operation, the comfort system of the present invention can preferably provide heating, cooling, ventilation or a combination thereof to an occupant of a seat having the insert. In one embodiment, heating is provided by inducing electrical current (e.g., from the automotive vehicle battery) to travel through the heater sub-layer 32 such that the heater sub-layer 32 provides heat to the trim layer 14, an occupant of the seat or both. Alternatively, heating may be provided by warming or heating air (e.g., with a thermoelectric air mover) and moving the air via the air mover through one of the tubular structures 62, 80, the open space 16, the openings 48 in the forward layer 20, the opening 186 in the tubular structures and ultimately to the trim layer 14, the occupant or both.

If ventilation is desired, the air mover can be operated to pull air or push air through the trim layer 14, the openings 48 in the forward layer 20, the open space 16, the openings 186 of the tubular structures 80 or a combination thereof. Such air preferably flows at least partially past the occupant of the seat and before of after flowing through the seat cover (e.g., a perforated leather seat cover or cloth seat cover) thereby providing ventilation to the occupant and providing convective heat transfer from the occupant to the flowing air. If cooling is desired, the air pushed toward the trim layer 14, the occupant or both may be cooled by cooling air (e.g., with a thermoelectric air mover) and moving the air through the tubular structures, the open space 16 or both and ultimately to the trim layer, the occupant or both. It should be understood that cooling, ventilating, heating or a combination thereof may be controlled by the control unit.

In embodiment having a heater sub-layer, it may be preferable for only the heater sub-layer 32 or the ventilation or cooling system to be running at one time, however, it is contemplated that both may be operated simultaneously. Moreover, it is contemplated that both the heater sub-layer 32 and the ventilation or cooing system may be operated at various levels (e.g., 2 or more levels of output) such as by having an air mover that can operate at different levels or by having various levels of electricity flowing through or throughout the heater sub-layer 32.

It is also contemplated that one or more temperature sensors (e.g., a thermostat, a thermistor or the like) may be included adjacent the heater sub-layer, the trim layer or the like. Preferably, any temperature sensors are near a seating surface of the seat closely related to (e.g., at or near) a temperature being experienced by an individual in the seat. Such temperature sensors may be in signaling communication with the control unit such that the control unit can control the air mover, the heater sub-layer or both for attaining or maintaining a desired temperature at areas adjacent the individual and/or the temperature sensor. Moreover, the control unit may be programmed with instructions for commanding the air mover, the heater layer or both to change output levels (e.g., turn on or turn off) if the temperature sensor senses a temperature above or below one or more threshold levels. An example of such programming is described in a copending patent application titled "AUTOMOTIVE VEHICLE SEATING COMFORT SYSTEM", Ser. No. 60/428,003, filed Nov. 21, 2002 and incorporated herein by reference for all purposes.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A ventilated seat for a vehicle, comprising:
a vehicle seat having a seat cushion component and a backrest cushion component, at least one of which is ventilated, each ventilated component having an air-permeable trim surface at occupant contact areas of the seat;
an open space located beneath the trim surface of at least one of each ventilated component; and
an air mover assembly in fluid communication with the open space, wherein the air mover assembly is fastened to a back support adjustment assembly with one or more members that extend substantially vertically when the backrest cushion component is in an upright position and wherein the one or more members comprise a pair of lumbar rods.

2. The ventilated seat of claim 1 wherein the ventilated component includes an opening extending therethrough for at least assisting in providing fluid communication between the air mover assembly and the open space.

3. The ventilated seat of claim 1 wherein the air mover assembly comprises a thermoelectric unit.

4. The ventilated seat of claim 1, further comprising a heater layer.

5. The ventilated seat of claim 1 further comprising a tubular structure at least partially providing fluid communication between the air mover assembly and the open space.

6. The ventilated seat of claim 5, wherein the tubular structure extends entirely through the seat cushion.

7. The ventilated seat of claim 6, further comprising a snap-fit configuration for attachment of the tubular structure with the air mover assembly and wherein the tubular structure is flexible.

8. The ventilated seat of claim 5, further comprising a snap-fit configuration for attachment of the tubular structure with the air mover assembly and wherein the tubular structure is flexible.

9. The ventilated seat of claim 8, wherein the tubular structure extends entirely through the seat cushion.

10. A ventilated seat for a vehicle, comprising:
a vehicle seat having at least one ventilated component with a seat cushion or a backrest cushion, each ventilated component having an air-permeable trim surface at occupant contact areas of the seat;
an air mover assembly including a mounting structure and a plurality of fasteners attached to the mounting structure wherein at least a portion of the air mover assembly is attached to one or more components behind the seat cushion or the backrest cushion;
a tubular structure providing fluid communication between the air mover assembly and an open space, the open space being located beneath the trim surface of each ventilated component, and provided by a spacer layer;
wherein the air mover assembly is in fluid communication with the open space and,
wherein the one or more components behind the seat cushion or backrest cushion are metal rods that are part of a lumbar or back support adjustment assembly and the plurality of fasteners are attached to the metal rods.

11. The ventilated seat of claim 10 wherein the ventilated component comprises the backrest cushion component.

12. The ventilated seat of claim 10 wherein the lumbar or back support adjustment assembly comprises at least a portion of a frame of the seat.

13. The ventilated seat of claim 10 wherein the one or more metal rods are substantially stationary relative to the backrest cushion.

14. The ventilated seat of claim 10 wherein the air mover assembly comprises a blower that is fastened to a pair of the metal rods.

15. The ventilated seat of claim 10 wherein the lumbar or back support adjustment assembly comprises a lumbar adjustment assembly.

16. The ventilated seat of claim 10, wherein the seat cushion or backrest cushion includes an opening extending therethrough, and the tubular structure extends at least partially into the opening.

17. The ventilated seat of claim 10, further comprising a snap-fit configuration for attachment of the tubular structure with the air mover assembly and wherein the tubular structure is flexible.

18. The ventilated seat of claim 10, further comprising a heater layer.

19. The ventilated seat of claim 10, further comprising a thermoelectric device.

20. A ventilated seat for a vehicle of claim 10, wherein the air mover assembly is attached to the metal rods via at least one fastener;
wherein the at least one fastener includes a body portion with projections extending back from a first end of the fastener, a conical projection extending forward towards the first end, the projections and conical projections adapted to secure to the air mover assembly and a second end adapted to removably join with the metal rods.

21. The ventilated seat of claim 10 wherein the lumbar or back support adjustment assembly further comprises one or more of plates, flexible members, fasteners, motors or combinations thereof.

22. The ventilated seat of claim 21 wherein the air mover assembly comprises a blower that is fastened to the one or more plates, flexible members, fasteners, motors or combinations thereof.

23. A ventilated seat for a vehicle, comprising:
a) a polymeric foam cushion;
b) at least one through-hole passage that extends through the cushion;
c) an air-permeable trim surface disposed over the cushion at occupant contact areas of the seat;

d) a peripheral edge-sealed insert for providing an open space beneath the air-permeable trim surface;
e) a plurality of sub-passageways for facilitating air communication between the open space and an air mover, the air mover in fluid communication with the open space of the insert through the through-hole passage and the sub-passageways;
f) a flexible electrical heater layer;
g) a thermoelectric unit coupled with the air mover;
h) a programmable control unit for operating the air mover;
i) at least one temperature sensor in signaling communication with the programmable control unit;
j) a tubular structure that extends through the through-hole passage and attaches to the air mover; and
k) a lumbar or back support adjustment assembly.

24. The ventilated seat of claim 23, further comprising a heater layer.

25. A ventilated seat for a vehicle, comprising:
a) a polymeric foam cushion;
b) at least one through-hole passage that extends through the cushion;
c) an air-permeable trim surface disposed over the cushion at an occupant contact area of the seat;
d) a peripheral edge-sealed insert for providing an open space beneath the air-impermeable trim surface, an air permeable polymeric layer disposed between the cushion and the air-permeable trim surface;
e) a plurality of sub-passageways for facilitating air communication between the open space and an air mover, the air mover in fluid communication with the open space of the insert through the through-hole passage;
f) an upper layer of the insert that includes a film or a textile and has a plurality of openings therein;
g) a thermoelectric unit coupled with the air mover;
h) a programmable control unit for operating the air mover;
i) at least one temperature sensor in signaling communication with the programmable control unit;
j) a tubular structure that extends through the through-hole passage and attaches to the air mover; and
k) a lumbar or back support adjustment assembly to which the air mover is attached.

26. The ventilated seat of claim 25, further comprising a heater layer.

27. The ventilated seat of claim 25, wherein the upper layer of the insert includes an adhesive layer thereon.

\* \* \* \* \*